United States Patent
Dann et al.

(10) Patent No.: US 9,194,764 B2
(45) Date of Patent: Nov. 24, 2015

(54) SENSOR DEVICE FOR DETECTING AT LEAST ONE FLOW PROPERTY OF A FLUID MEDIUM

(71) Applicants: Wolfgang Dann, Truegleben (DE); Andreas Stark, Lauscha (DE)

(72) Inventors: Wolfgang Dann, Truegleben (DE); Andreas Stark, Lauscha (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/072,094

(22) Filed: Nov. 5, 2013

(65) Prior Publication Data

US 2014/0123741 A1    May 8, 2014

(30) Foreign Application Priority Data

Nov. 5, 2012   (DE) .......................... 10 2012 220 098

(51) Int. Cl.
*G01M 15/04*   (2006.01)
*G01F 1/00*    (2006.01)

(52) U.S. Cl.
CPC . *G01M 15/04* (2013.01); *G01F 1/00* (2013.01)

(58) Field of Classification Search
CPC ....... G01F 1/684; G01F 1/6842; G01F 15/14; G01F 1/00
USPC ...................................................... 73/114.32
See application file for complete search history.

(56) References Cited

U.S. PATENT DOCUMENTS

| | | | | |
|---|---|---|---|---|
| 4,833,912 | A * | 5/1989 | Ohta et al. ................. | 73/114.32 |
| 5,703,287 | A * | 12/1997 | Treutler et al. ............ | 73/204.26 |
| 5,705,745 | A * | 1/1998 | Treutler et al. ............ | 73/204.26 |
| 6,318,170 | B1 * | 11/2001 | Renninger et al. ......... | 73/204.26 |
| 7,373,816 | B2 * | 5/2008 | Strohrmann et al. ...... | 73/204.26 |
| 7,712,361 | B2 * | 5/2010 | Uramachi .................. | 73/204.22 |
| 8,347,707 | B2 * | 1/2013 | Uramachi et al. ......... | 73/204.22 |
| 8,511,158 | B2 * | 8/2013 | Kishikawa et al. ........ | 73/204.22 |
| 8,763,452 | B2 * | 7/2014 | Doi et al. ................... | 73/204.11 |
| 2002/0064649 | A1 * | 5/2002 | Lembke et al. ............... | 428/336 |
| 2002/0069699 | A1 * | 6/2002 | Sato et al. .................. | 73/204.22 |
| 2012/0103107 | A1 * | 5/2012 | Uramachi et al. ......... | 73/861.08 |
| 2013/0269419 | A1 * | 10/2013 | Etherington et al. ............. | 73/37 |

FOREIGN PATENT DOCUMENTS

DE         10345584       4/2005

* cited by examiner

*Primary Examiner* — Freddie Kirkland, III
(74) *Attorney, Agent, or Firm* — Kenyon & Kenyon LLP

(57) ABSTRACT

A sensor device for detecting at least one flow property of a fluid medium, in particular for detecting the air flow in the intake tract or the charge air tract of an internal combustion engine is provided. The sensor device has a sensor housing, which has an electronics chamber, an electronic module being situated at least partially in this electronics chamber. The electronic module has at least one support profile and at least one circuit carrier connected to the support profile. The circuit carrier carries at least one evaluation circuit. The sensor device is characterized in that electronic components are situated on the circuit carrier, on both a top side and a bottom side, and the support profile has a cavern which accommodates at least one electronic component situated on a bottom side of the circuit carrier.

13 Claims, 2 Drawing Sheets

SENSOR DEVICE FOR DETECTING AT LEAST ONE FLOW PROPERTY OF A FLUID MEDIUM

BACKGROUND OF THE INVENTION

Flow meters are used to ascertain the air flow in the intake tract and the charge tract of an internal combustion engine. Since the weight ratios are important in the chemical process of combustion, the mass flow rate of the intake/charge air is to be measured, for which volume measuring methods or impact pressure measuring methods are used to some extent.

Various types of sensors are known for measuring the air mass throughput. One such type of sensor is the so-called hot-film mass airflow sensor, such as that described in one possible specific embodiment in German Published Patent Application No. 103 45 584. The flow meter according to German Published Patent Application No. 103 45 584 has a sensor housing, having a cavity, for accommodating an electronic module, which is separated from a bypass-measuring channel. The electronic module here has a support profile, which is formed essentially on a bottom plate having side webs molded on the opposing longitudinal sides. The electronic module also has a plastic support tongue, which is situated on one of the head sides of the support profile and accommodates the sensor element. A circuit board equipped with electronic components and printed conductors is usually attached to the bottom plate of the support profile to provide an evaluating electronic unit.

German Published Patent Application No. 103 45 584 also describes how the electronic module is held by the side webs in the cavity provided here after being inserted into the sensor housing, while achieving a clamping effect. The molded sensor receptacle here protrudes into the bypass measuring channel through an outlet opening between the latter and this cavity.

With advances in the field of hot-film mass airflow sensors, the evaluation circuits implemented on the circuit board due to the expansion of same with more and more functions have become increasingly more complex, so that these requirements cannot be met merely by a denser configuration of the electronic components alone in the case of an assembly surface having a limited surface area. A double-sided assembly on both the top and bottom sides of the circuit board is thus necessary, while the size of the installation space and the assembly area remain the same.

Openings in the bottom plate of the support profile, through which the electronic components situated on the bottom side of the circuit board may protrude, have been provided previously. However, the stiffness of the construction is reduced by this opening and the stability in the alternating thermal stress load decreases. Furthermore, an additional cover or seal of the electronic components passing through the openings on the back side of the support profile is necessary. This has disadvantageously resulted in a restricted lifetime of the electric connections.

SUMMARY

A weakening of the construction of the support profile and a reduction in the thermal stability of the support profile are preventable by using the approach proposed according to the present invention. This is the case in particular due to the fact that the sensor device proposed according to the present invention has a support profile in which a cavern is formed, which may be designed in the form of a recession forming a cavity.

A sensor device for detecting at least one flow property of a fluid medium is proposed accordingly, in particular for detecting the airflow in the intake tract or the charge air tract of an internal combustion engine. The proposed sensor device has a sensor housing. The sensor housing describes in particular a shaping body of the sensor device, which may be formed in one piece, for example, or as a body composed of multiple parts. The sensor housing of the proposed sensor device has at least one electronics chamber in which an electronic module is situated at least in part. With regard to the electronics chamber accommodated in the sensor housing, the sensor housing is also used to exert a protective function with respect to electronics situated in the electronics chamber. This protective function of the sensor housing should protect the sensitive electronics in particular from influences which would have a long-lasting negative effect on the function thereof due to the flowing medium. The electronics chamber in general describes a space in the sense of a cavity created artificially inside the sensor housing, which is used for accommodating an electrical circuit, in particular a triggering electronic unit and/or an evaluating electronic unit.

In another housing section of the sensor housing, a bypass channel through which the fluid medium is conducted may be provided, so that the fluid flows around a sensor held by a sensor receptacle. It is advantageous here if the electronic module, which is situated at least partially in the electronics chamber, is situated with at least a portion of the sensor receptacle in the bypass channel. The sensor housing may also exert a protective function on the sensor receptacle and a sensor, which may be situated on it to ensure a continuing functionality of the sensor as well as a secure accommodation of the sensor from the sensor receptacle.

Furthermore, the electronic module has a support profile and a circuit carrier connected to the former, which provides an evaluation circuit for processing the measured data detected by the sensor. An evaluation circuit is understood in general within the context of the present invention to be a triggering electronic unit and/or an evaluating electronic unit of the sensor device or a part of such a triggering electronic unit and/or evaluating electronic unit. The triggering electronic unit and/or the evaluating electronic unit may be equipped in general to trigger at least one function of the sensor device and/or to detect at least one signal generated by the sensor device. In the sense of this document, a circuit carrier in general describes a device which implements an electrical circuit. This may be in particular a single layer or multilayer circuit board which accommodates printed conductors and electronic components. The circuit carrier may be a planar circuit carrier in particular.

For providing extensive evaluation circuits, there is the possibility that electronic components are situated on the circuit carrier, on both a top side and on a bottom side. Such an assembly of the circuit carrier on both sides makes it possible on the one hand to provide a more complex evaluation circuit on the circuit carrier and, on the other hand, to add additional functions to the evaluation circuit. According to the present invention, the support profile here has a cavern which is provided for accommodating at least one electronic component situated on the bottom side of the circuit carrier. If an assembly of the circuit carrier in the manner described above is provided on both its top side and its bottom side, a connection of such a circuit carrier with a support profile according to the related art in the manner customary previously would result in an altered elevated position of the circuit carrier on the support profile. This would also have negative effects on an electrical connection of the evaluation circuit on the circuit carrier with a sensor situated on the sensor receptacle as well as distances, which may no longer be feasible, from the electronics chamber cover, which is provided to close off the electronics chamber.

The cavern is preferably positioned on the planar surface of the support profile in such a way that after connecting the circuit carrier to the support profile, the electronic components situated on the bottom side of the circuit carrier come to lie inside the cavern.

A cavern in the sense of this document is understood in general to be a cavity which is created in some areas or comparably a recession in the form of a trough, which may have a constant depth or may also have different depths in some sections. However, it is advantageous for production-related reasons if the cavern preferably has a uniform depth over the total area of the recession, in particular if the depth of the cavern goes only slightly beyond the depth required to accommodate the electronic components to achieve the greatest possible stiffness of the support profile. However, if multiple electronic components are situated on the bottom side of the circuit carrier, and if these multiple electronic components have a great variation in height, which would promote relatively deep caverns, for example, only because of a single one of these electronic components, in this case a deeper section of the cavern may be provided, adapted accordingly only in the area of this one larger component, the remainder of the cavern in turn having a uniform depth according to the remaining electronic components. An otherwise created extra, not filled hollow space within the cavern is thereby prevented.

This creates the particular advantage that the support profile is provided with one or more recesses for the components situated on the bottom side of the circuit carrier to pass through, and the associated structural weakening of the support profile is thereby prevented. Providing a cavern in the support profile according to the present invention advantageously maintains the lateral and longitudinal stiffness of the construction and also, in a further advantageous manner, creates the possibility of preventing an alternating thermal stress load caused by temperature fluctuations and the development of different temperature zones within the support profile and the associated different thermal expansion in some sections and to advantageously divert the temperature easily via the material of the cavern or to equalize it over large areas. The cavern is preferably to be of such surface dimensions that the side walls of the cavern preferably cannot come in contact with the components situated on the bottom side of the circuit carrier when there is thermal expansion so as not to cause them to bend.

The circuit carrier may be formed, for example, by a known circuit board having a mounted SMD electronic unit. Additionally or alternatively, the circuit carrier may also be, for example, a hybrid circuit board, a hybrid flex film or a hard flex film having mounted SMD electronics and/or hybrid electronics. The evaluation circuit is preferably mounted on the circuit carrier here and may preferably be used for complete or partial analysis of measured data. The sensor device may thus have, for example, at least one sensor, for example, a sensor element, which protrudes into the flow of the fluid medium, for example, in a bypass channel of the sensor device. This may be a hot-film mass airflow sensor chip, for example, i.e., a chip having a heating element and at least two temperature sensors, the temperature sensors being able to detect an asymmetry in a temperature distribution due to the flow of the fluid medium. The sensor element may be situated, for example, in or on a sensor support which may be part of the support profile or may be connected to the support profile and which may protrude entirely or partially into the flow of the fluid medium. The evaluation circuit may be equipped in particular to control a measurement with the sensor element and/or to analyze all or most of the sensor data provided by the sensor element.

It has been found that the stiffness of the construction of the support profile is generally preserved in order to fasten this in the sensor housing in a preferred manner while creating a clamping effect. Likewise it has advantageously been found that the stability of the electronic module is not reduced even under alternating thermal stress load, which may occur under some conditions, and would be detrimental to the lifetime of possible electrically conducting solder joints and/or bonding wire connections.

According to another idea on which the present invention is based, the cavern may form an integral part of the support profile. This means that the cavern may preferably be manufactured in one production step together with the support profile and made of the same material as the support profile. The support profile and the cavern here form a shared profile body in particular. It is possible in this way to avoid contact sites which are otherwise necessary but which would have a negative influence on the structural rigidity, the thermal conductivity of the support profile or the stability of a connection and fastening of the cavern in the support profile, which would otherwise be necessary. In addition, a plurality of the specific embodiments of the support profiles described above may be manufactured simultaneously with an integrally molded cavern, preferably in a single operating step, for example, in a single punching-bending operation step. Time may be advantageously saved during production in this way, and additional use of control steps carried out manually or automatically to check on the quality of a cavern created subsequently may be omitted or unnecessary.

Providing a cavern according to the present invention may be implemented according to another specific embodiment of the present invention by the fact that the support profile is shaped entirely or partially as a punched-bent part from one metal sheet. The support profile may thus be shaped from one metal sheet, for example, by a punching-bending operation. A support profile manufactured in this way offers a variety of advantages. For example, the possible use of a copper alloy or aluminum alloy results in a design of the support profile having thermal stability and dimensional stability. Furthermore, this is associated with a comparatively low cost of materials and also advantageously ensures a relatively low inherent weight of the support profile.

However, alternative shaping methods may also be used to manufacture the proposed support profile, for example, by manufacturing the support profile entirely or partially from a plastic and by forming the cavern in a plastic molding method.

Manufacture of the support profile as an injection-molded plastic part using an injection molding method is possible, for example. There are known injection molding methods for this purpose, which allow the use of a wide variety of materials, for example, metal, ceramic or plastic. Each of these has advantageous properties with respect to dimensional stability, shape flexibility, thermal stability and/or thermal conductivity. Additional material-specific properties which take into account the idea according to the present invention in an advantageous manner are conceivable, but this is not a conclusive list. For example, it is advantageous if the support profile is manufactured as an injection-molded plastic part, where the plastic used is a thermoplastic material with a high thermal stability.

According to another embodiment of the present invention, it may be advantageous if the support profile has an integral molded or injection-molded sensor receptacle. The sensor receptacle may preferably be designed in such a way that it protrudes into the flow bypass channel through a connecting opening provided between the latter and the electronics chamber. It is possible in this way for a sensor held by the sensor receptacle to have the fluid medium flowing all around it, for example, through the flow bypass channel or for the fluid medium to be able to flow over at least one surface of the sensor.

In addition, it may be provided that according to a preferred specific embodiment, the support profile is connected to the circuit carrier. For example, the circuit carrier may be connected to the support profile by at least one connection, selected from a form-fitting connection, a force-locked connection and an integrally bonded connection. The circuit carrier may therefore be clipped or clamped to the support profile, for example. However, equally preferably a layer of an adhesive provided in at least some areas may be situated between the support profile and the circuit carrier.

In addition, there is the possibility of additionally or alternatively situating at least one passivation layer between the support profile and the circuit carrier in the area of the cavern. Thus, if necessary, at least one passivation layer, which is curable on the support profile before assembly of the circuit carrier, may be mounted on the circuit carrier. The circuit carrier thus does not require any further sealing function with respect to a surface or a side of the circuit carrier facing the cavern after being assembled in the sensor housing. The passivation layer may additionally preferably function as protection against aggressive media and moisture as the causative factor for corrosion and other damage.

It is also conceivable for a passivation compound, which is introduced accordingly to form the passivation layer and which may be, for example, a gel, an adhesive or a thermal conductivity paste to be introduced into the cavern even before the circuit carrier is mounted on the support profile. Furthermore, this passivation compound may be curable for subsequent fixation in particular. The curing may take place immediately after the passivation compound has been introduced, after assembly or at a later subsequent point in time during the manufacturing process. In addition, it is possible to use a suitable UV-activatable material for this purpose, for example, a UV-activatable gel, which is activated immediately before or during the assembly of the circuit carrier on the support profile. Other known methods of activating the passivating compound such as, for example, by heat are also conceivable and are easily accomplished in an advantageous manner.

Furthermore, the sealing function of the circuit carrier with respect to the support profile and of the support profile with respect to the sensor housing is still assured advantageously.

DETAILED DESCRIPTION

Figure 1:
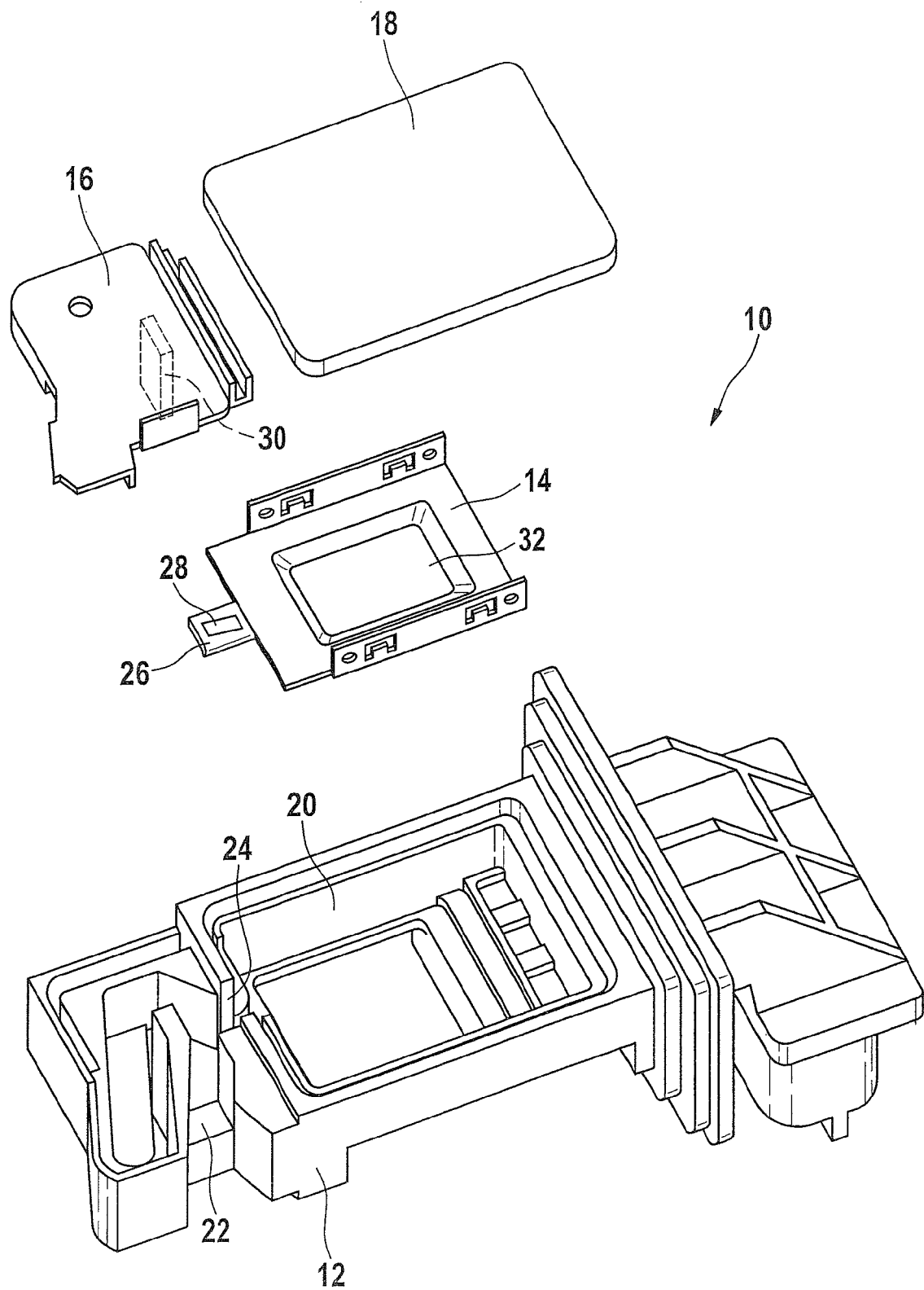
FIG. 1 shows an exploded view of a preferred specific embodiment of the sensor device according to the present invention.

FIG. 1 shows the components of a preferred specific embodiment of sensor device 10 according to the present invention in an exploded view. Sensor housing 12, a support profile 14 according to the present invention, a bypass channel cover 16 and an electronics chamber cover 18 are essentially shown here.

Furthermore, an electronics chamber 20 and a bypass channel 22 are preferably accommodated in sensor housing 12 and are connected to one another via a connecting opening 24.

Furthermore, the diagram in FIG. 1 shows that support profile 14 has an integrally molded sensor receptacle 26, which protrudes in particular through connecting opening 24 into bypass channel 22 in an installed state of support profile 14 in electronics chamber 20 (not shown here). Sensor receptacle 26 here functions essentially to accommodate sensor 28 and, associated with this, it functions to position sensor 28 in bypass channel 22 in the installed state of support profile 14 in sensor housing 12. In addition, a bypass channel cover 16 is provided, which closes bypass channel 22 at the side, which is open for production-related reasons and on which a tongue 30 is formed, which closes connecting opening 24 after introducing sensor receptacle 26 into connecting opening 24. Furthermore, electronics chamber cover 18, which is also illustrated, is used to close electronics chamber 20.

Figure 2:
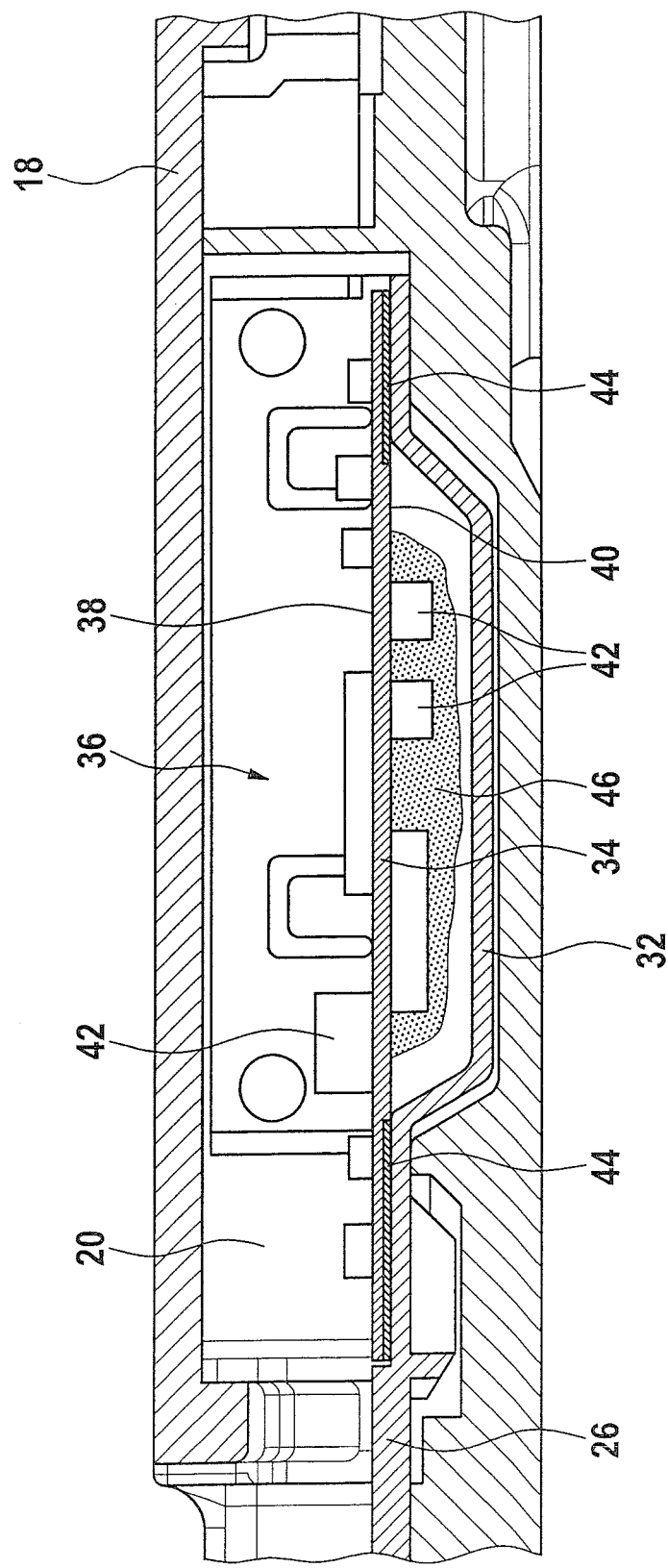
FIG. 2 shows a cross-sectional view of a preferred specific embodiment of the sensor device according to the present invention.

The diagram in FIG. 2 shows in particular a preferred specific embodiment of a support profile 14 according to the present invention, having a cavern 32 preferably provided therein, shown here in a cross-sectional view.

The diagram according to FIG. 2 shows in particular that a circuit carrier 34 for providing an evaluation circuit 36 is assembled with electronic components 42 on both its top side 38 and its bottom side 40. Furthermore, support profile 14 has a cavern 32, as proposed according to the present invention. Cavern 32 in support profile 14 is preferably shaped in such a way that electronic components 42 provided on bottom side 40 of circuit carrier 34 come to lie in cavern 32 after circuit carrier 34 is connected to support profile 14. The diagram in FIG. 2 shows in this regard that a layer of adhesive 44 is applied to at least some sections between circuit carrier 34 and support profile 14 for joining circuit carrier 34 and support profile 14.

According to another variant of the preferred specific embodiment according to FIG. 2, it is provided that the remaining hollow space inside cavern 32 is at least partially filled with a passivation layer 46. The passivation layer here functions mainly to provide electric insulation for bottom side 40 of circuit carrier 34 with respect to the material of support profile 14, which may be electrically conductive, depending on the specific embodiment.

What is claimed is:

1. A sensor device for detecting at least one flow property of a fluid medium, comprising:
    a sensor housing having an electronics chamber;
    an electronic module at least partially situated in the electronics chamber, the electronic module having at least one support profile and at least one circuit carrier connected to the support profile, the circuit carrier carrying at least one evaluation circuit; and
    electronic components situated on the circuit carrier on both a top side of the circuit carrier and a bottom side of the circuit carrier, wherein the support profile has a cavern accommodating at least one of the electronic components situated on the bottom side of the circuit carrier, an entirety of the cavern being bounded by the support profile and the circuit carrier;
    wherein the sensor housing has a base portion, and the support profile is situated between the base portion and the cavern.

2. The sensor device as recited in claim 1, wherein the cavern is integrally formed in the support profile.

3. The sensor device as recited in claim 1, wherein the support profile is manufactured as a punching-bending part from a metal sheet.

4. The sensor device as recited in claim 1, wherein the support profile is manufactured as an injection-molded plastic part.

5. The sensor device as recited in claim 4, wherein the injection-molded plastic part includes a thermoplastic material having a high thermal stability.

6. The sensor device as recited in claim 1, wherein the support profile has a sensor receptacle that is one of integrally molded and injection-molded.

7. The sensor device as recited in claim 1, wherein the circuit carrier and the support profile are connected to one another.

8. The sensor device as recited in claim 1, further comprising a passivation layer situated between the support profile and the circuit carrier in an area of the cavern.

9. The sensor device as recited in claim 8, wherein the passivation layer is curable after joining the circuit carrier to the support profile.

10. The sensor device as recited in claim 8, wherein the passivation layer is made one of entirely and partially of an adhesive.

11. The sensor device as recited in claim 10, wherein the adhesive has a thermal conductivity.

12. The sensor device as recited in claim 8, wherein the passivation layer is made of one of a UV-activatable material and a heat-activatable material.

13. The sensor device as recited in claim 1, wherein the sensor device is for detecting an air flow in one of an intake tract and a charge air tract of an internal combustion engine.

\* \* \* \* \*